United States Patent [19]
Den Boer

[11] 4,096,701
[45] Jun. 27, 1978

[54] MATTRESSES FOR SUBAQUEOUS STRUCTURES

[75] Inventor: Cornelis Den Boer, Abbenbroek, Netherlands

[73] Assignee: Imperial Chemical Industries Limited, London, England

[21] Appl. No.: 764,863

[22] Filed: Feb. 2, 1977

[30] Foreign Application Priority Data

Feb. 10, 1976 United Kingdom ............... 5176/76

[51] Int. Cl.$^2$ ............................................. E02B 3/12
[52] U.S. Cl. ...................................... 61/38; 112/441; 428/286; 428/287
[58] Field of Search ................. 61/37, 38, 2, 3, 7, 61/35; 428/286, 287; 112/441; 28/77

[56] References Cited

U.S. PATENT DOCUMENTS

| | | | |
|---|---|---|---|
| 3,649,428 | 3/1972 | Hughes | 28/77 |
| 3,811,287 | 5/1974 | De Winter | 61/38 |
| 4,002,034 | 1/1977 | Muhring et al. | 61/38 |

FOREIGN PATENT DOCUMENTS

| | | | |
|---|---|---|---|
| 2,289,340 | 5/1976 | France | 61/38 |
| 2,263,684 | 7/1974 | Germany | 61/38 |
| 2,320,801 | 11/1974 | Germany | 61/38 |
| 7,011,473 | 8/1971 | Netherlands | 61/38 |
| 990,519 | 4/1965 | United Kingdom | 28/77 |
| 1,022,319 | 3/1966 | United Kingdom | 61/38 |
| 1,213,428 | 11/1970 | United Kingdom | 61/7 |

*Primary Examiner*—Paul R. Gilliam
*Assistant Examiner*—A. Grosz
*Attorney, Agent, or Firm*—Cushman, Darby & Cushman

[57] ABSTRACT

A mattress for civil engineering use, including use in subaqueous structures, comprising two plies of synthetic fabric, one of which is non-woven, the other being woven, said plies being joined through sewn threads along one length of the mattress in parallel lines 10–100 cm apart with at 10–100 cm intervals, 2–8 cm lengths of unsewn threads forming loops for tying on fascines, said mattress being provided with fascines attached by means of said loops.

2 Claims, 2 Drawing Figures

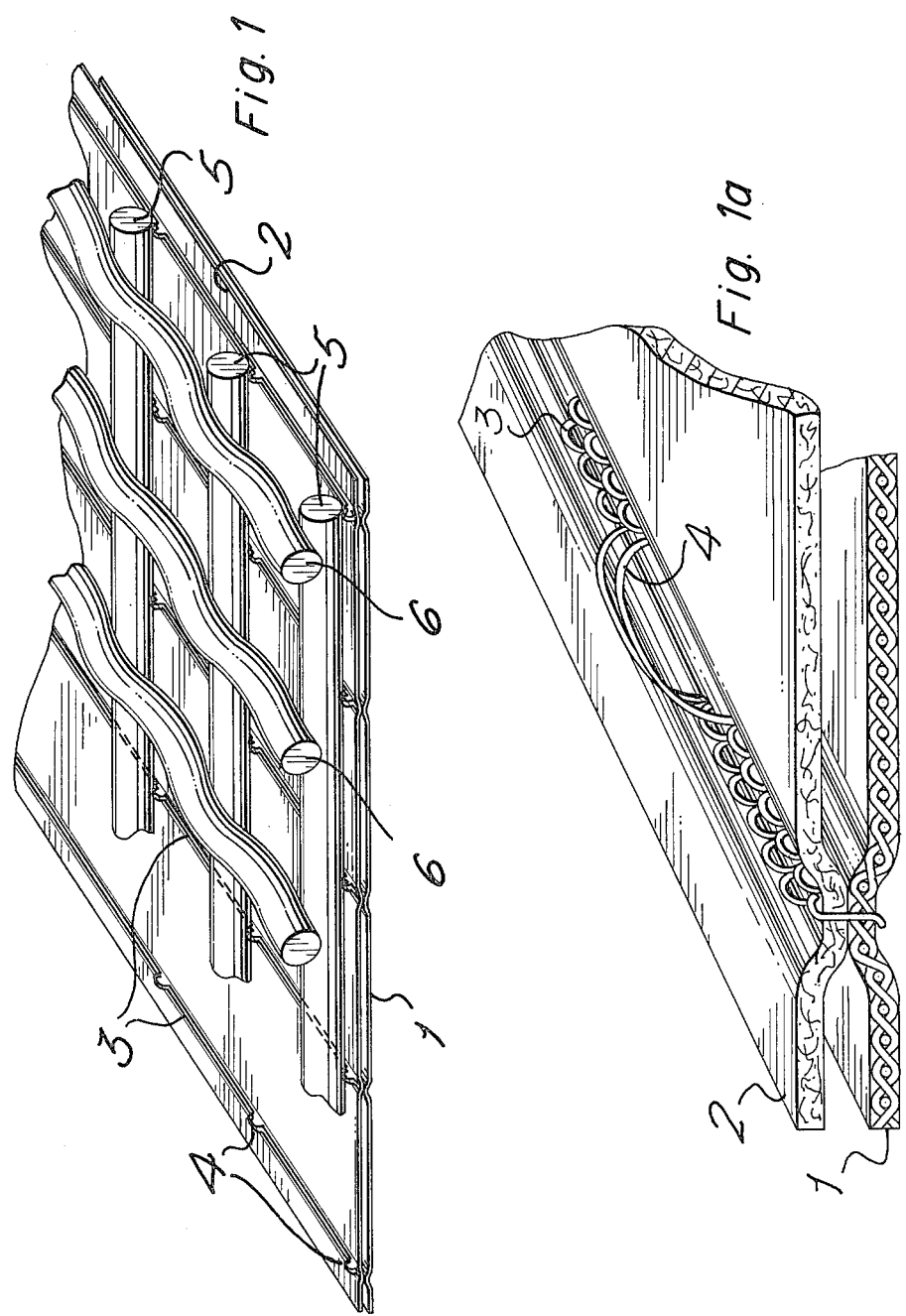

MATTRESSES FOR SUBAQUEOUS STRUCTURES

This invention relates to mattresses for use in the construction of subaqueous structures. Traditionally, such structures have been made of interwoven willow or osier. Recently there have been described synthetic fibre alternatives for the mattress structures, but in order to produce adequate tensile properties, woven fabrics have been proposed. Woven fabrics such as woven polypropylene tape fabric often have a pore size which is too large to prevent the passage of sand or mud. A woven fabric with a small pore size will often be too expensive for this application. Substitution of non-woven fabrics, which maybe cheaper, has been proposed, but the tensile properties of currently available materials are often inadequate.

Our invention provides a mattress for civil engineering use, including use in subaqueous structures, comprising at least two plies of synthetic fabric, one of which is non-woven, another being woven. It is preferred that in use, the woven fabric provides the lower surface. Suitable fabrics may be made from polyester, polyamide, polyolefin or other fibre forming polymers or combinations thereof. Non-woven fabrics may be made by the use of adhesives, partial solvents, needlepunching or spunbonding methods applied to mats of fibrous materials. Especially preferred is the use of bi-component fibre in which one component has a lower melting point than the other. Bonding is achieved by means of heating to a temperature intermediate between the melting points of the two fibres. A suitable non-woven fabric is 'TERRAM' non-woven fabric (Registered Trade Mark: ICI Ltd.) in which polypropylene fibre is combined with a lower temperature melting polyamide or polyethylene for bonding purposes. The mattress may be made by superimposing two or more plies of fabric, and linking them together over at least part of the surface area. A preferred structure comprises a ply of a woven polypropylene fabric sewn to a ply of a non-woven fabric. The plies may be glued, stapled or sewn. If the latter method is used it is very convenient to sew in lines along or across the fabric and to leave periodic sections of sewing thread loose on the surface of the mattress to serve as a loop for tying on fascines. For example the plies may be sewn with threads along one length of the mattress in parallel lines 10-100 cm apart. In each line of sewing one or more individual threads may be used. At similar 10-100 cm intervals a short length of thread is left unsewn, and loose on the surface. Such a length may be from 2 to 8 cm.

In use, fascines may be laid across the mattress and bonded to it by means of the sewn loops. Perpendicular to the first set of fascines, a second group of fascines may be added to provide the usual grid-like structure. The fascines themselves may be made of conventional natural materials, or may be at least partially replaced by synthetic fascines, such as plastics tubes which may be hollow and fillable with cement or foam, or such as tubes of non-woven fabric which may similarly be filled. Fascines of lower or higher density than water will be selected according to the degree of buoyancy required.

The invention is illustrated by the following description of a preferred embodiment with reference to FIG. 1.

A fabric sheet 1, being a woven polypropylene material, was covered with a second fabric sheet 2 made of meltbonded bicomponent (polypropylene/polyamide) fibres. The joining was completed by lines of sewing (3), 50 cm apart, in each line there being two polypropylene threads. Every 50 cm along each line of threads, for 5 cm length, the threads were left unsewn to form loops 4. Fascines 5 were laid across each line of threads, 50 cm apart and tied to the loops 4. A grid of fascines was completed by perpendicular application of a second group of fascines 6. The fascines were formed by injecting polyurethane foam into tubes of non-woven fabric formed from strips folded over and joined by sewing.

We claim:

1. A mattress for civil engineering use, including use in subaqueous structures, comprising two plies of synthetic fabric, one of which is non-woven, the other being woven, said plies being joined by sewn threads along one length of the mattress in parallel lines 10-100 cm apart with at 10-100 cm intervals, 2-8 cm lengths of unsewn threads forming loops for tying on fascines, said mattress being provided with fascines attached by means of said loops, said fascines being formed from tubes of non-woven fabric.

2. A mattress according to claim 1 in which the tubes are filled with a plastics foam.

* * * * *